United States Patent Office
3,360,722
Patented Dec. 26, 1967

3,360,722
PROCESS AND APPARATUS FOR THE AUTOMATIC PERIODIC DETERMINATION OF THE MOISTURE CONTENT OF FIBROUS AND/OR LEAFY MATERIALS
Max Freiherr von Bethmann, Bremen, Wilhelm Dettmer, Delmenhorst, Johannes van Nooy, Bremen-Neu Vahr, and Rolf Gärtner, Berlin-Schoneberg, Germany, assignors to Firma Martin Brinkmann AG, Bremen, Germany
Filed Oct. 23, 1964, Ser. No. 406,130
Claims priority, application Germany, Oct. 31, 1963, B 74,091
13 Claims. (Cl. 324—65)

This invention relates in general to a method and device for testing materials, and in particular, to a new and useful method and device for the automatic and periodic determination of the moisture content of fibrous or leafy materials, preferably tobacco, using a calibrated electric measuring device.

Direct moisture measuring methods, for example, by drying the material are known, but they require considerable time for the individual measurement and it is only possible to obtain the moisture values after a certain period of time. An improvement in this respect was achieved by electrical measuring methods which make it possible to determine the measured values after a few seconds. In the known methods of this type, the systems usually employ an electrical resistance or capacity measurement in order to measure the moisture content. In these measuring methods it is necessary to set up calibration curves for comparison, for example such as by a standard arrived at by the distillation of benzine, in order to show the relations between the effective moisture values and the indicated electrical measuring values.

For the electrical measurement of leafy materials, particularly tobacco, it is of advantage to use electrical measurement resistance. Here it is not even necessary to use a defined amount of tobacco or a defined weight in the individual measurement and the material need not be evenly distributed in a defined measuring chamber of constant volume. This is indispensible, however, if the moisture is determined by capacity measurement. When the resistance measurement is employed, it is sufficient to compress the materials to be measured and maintain it at a constant pressure against the measuring of electrodes. This is necessary in order to maintain a reproducible transfer resistance between the tobacco and the electrodes and to insure that the sampling is done at the same moisture with the same tobacco density. In order to equalize any irregularities in the tobacco, a minimum pressure must not be exceeded and the layer thickness of the tobacco sample between the measuring plates must be at a certain minimum amount. With the known electrical resistance measuring instruments for determining moisture in material such as tobacco, it has been tried to meet the foregoing conditions by using spring activated measuring electrodes. The individual measurements are carried out by hand and it is not possible to make a sufficient number of measurements to obtain a representative number of measuring values corresponding to the requirements of the practical operating conditions. For this reason continuous moisture measuring instruments for tobacco and similar fibrous materials have been developed. In those known measuring instruments the cut tobacco is conducted, for example, by a conveyor device and the material to be measured is either conducted pressure free over the measuring electrodes or is subjected to the influence of measuring electrodes which can be designed, for example, as rollers which are pressed by spring force against the tobacco current. With devices of this nature it was found, however, that it was not possible to keep the factors which influence the measuring values sufficiently constant and apart from the moisture. This is particularly true for the transfer resistance between the tobacco and the electrodes so that either the reading of the measuring value must be considerably damped or the measuring values will have such a wide spread that they can be only used in practice to a limited extent. It is also known in the electrical measurement of fibrous materials such as tobacco that the temperature has a considerable influence on the reading. For this reason it is usually necessary to measure the temperature of the tobacco at points where considerable temperature fluctuations are expected, so that this value can be taken into account when determining the moisture. The arrangement is preferably such that the measured temperature is used directly to compensate the measured moisture value.

Particularly with tobacco, the temperature measurement is very difficult because the temperature is transferred very slowly to the measuring point owing to its structure unless the tobacco is pressed at the measuring point against the electrode. The use of a semi-conduction feeler or sensor has proved expedient for temperature measurement. With present known measuring methods and devices, it is not possible to measure the true tobacco temperature correctly, particularly when there is a sudden drop of the tobacco temperature, because the surrounding measuring point and thus the measured point itself cannot follow the temperature variations fast enough due to the sudden heat conduction.

In accordance with the invention, therefore, the above-mentioned difficulties are avoided by the use of a measuring device which is capable of continuously and periodically removing a sample of the material from a continuously flowing stream thereof and to compress the sample to a predetermined compression pressure against measuring electrodes. The invention advantageously includes means for automatically accumulating a sample in a stream, compressing the sample against the electrodes and then initiating the reading of the moisture and preferably the temperature to correct any moisture indication in accordance with the temperature indicated. The device advantageously also includes means for thereafter releasing the test sample and dumping it back into the stream and positioning the device for conducting a new test at the same location in the material flow stream.

In accordance with the preferred arrangement it is advisable to determine the moisture content by measuring the electric resistance of the material sample as well as the temperature of the material and using the temperature measured directly or indirectly for compensating the measured moisture value. The temperature measurement of the respective sample can be effected, for example, by means of a semi-conductor temperature feeler during the measuring cycle taken at the same period at which the moisture is measured. With such a method it is possible to obtain without difficulty a satisfactory reproducibility with a sufficient sensitivity of the reading. At the same time, it is also possible to obtain a sufficient number of measuring values for the current supervision of the operation.

A principal feature of the invention is that the tobacco is applied to the measuring electrodes with a constant contact pressure. The amount of the pressure is preferably so selected that on the one hand an approximate constancy of material density is obtained as soon as possible while the material is, on the other hand, only compressed to such an extent that the various samples automatically return to the material current or flow stream without being compressed so that lumps are formed. A particular advantageous operation is effected with the contact pressure of from 0.2 to 0.5 kg./sq. cm.

In accordance with another feature of the invention the device advantageously includes means for eliminating the heat surrounding the semi-conductive feeler during each cycle. This is accomplished, for example, by directing a short blast of compressed air over the conductive feeler. This is necessary because the feeler will show a slow reaction on cooling, but not on heating. The cooling inertia of the feeler can be overcome and the temperature be brought rapidly to a normal value below that of the temperature of the tobacco in order to be certain that the temperature is correctly measured. The directing of the blast of air over the feelers also provides a means for removing any residue material from the previously tested sample.

In accordance with a further feature of the invention there is provided a programmer for effecting the complete testing cycle including the accumulation of a test sample, the compression of the sample against the electrodes and the initiation of the measuring instruments and then the release of the material and the return of the material to the flow stream.

A further feature of the invention is the means for indicating the moisture as a direct value. In order to accomplish this a basic value is fed into the hygrometer when the measuring phase is not being carried out. This basic value is supplied by connecting a constant resistance in the measuring circuit. In this manner, deviations from this value as measurement with a constant resistance are indicated during the measuring phase. The circuit which is actuated by a programmer is effective to automatically switch the constant resistance out of the circuit when the measuring phase is initiated and to cut it back in again when the measuring phase stops.

In one practical embodiment of the device the measuring means are arranged between an upper conveyor which is locaetd to discharge material such as tobacco onto a lower conveyor. The device includes a collecting plate or platform which is automatically positioned between the conveyors to intersect the stream of the material and to collect a portion on the plate for testing purposes. Thereafter means are effective to compress the material against measuring electrodes to connect the measuring instruments for taking a reading electrically and to thereafter release the material and to drop it back onto the lower conveyor.

In a still further embodiment there is provided a pivotal lever arm having a collecting platform which is arranged to be disposed in a continuous conveyed stream of material, such as, for example, in a vibrating trough which is adapted to convey the material. In this embodiment, means are arranged for deflecting the stream of material onto the measuring plate so that a sample is collected at which time the compression plate is moved toward the measuring plate to compress the test sample between the electrodes and a measurement is taken as in the previous embodiment. The arm is arranged to be pivoted to permit dumping of the test sample back into the trough after the measurement is taken.

Accordingly, it is an object of this invention to provide an improved device for testing materials, such as tobacco.

A further object of the invention is to provide a device for testing materials which are fed in a continuous conveyed stream, which includes means to remove a sample from the conveyed stream, to compact the sample and to take measurements of moisture and in some instances temperature while the material is compacted and to thereafter return the material to the conveyed stream.

A further object of the invention is to provide a method of obtaining moisture indications of a material such as tobacco using an electrical resistance measuring means comprising compacting the material to a predetermined compacting pressure and simultaneously obtaining the indication of the moisture by the measuring means.

A further object of the invention is to provide a method for measuring the moisture content of a material such as tobacco comprising removing a sample of the material from a conveyed stream subjecting the sample to a compacting pressure of a uniform amount, simultaneously taking a temperature and moisture content reading by electrode feelers in contact with the tobacco while it is compacted and compensating the measurement obtained for a moisture indication by the electric resistance measurement by any variations in temperature which are also indicated.

A further object of the invention is to provide a device for measuring moisture of leafy material such as tobacco, which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
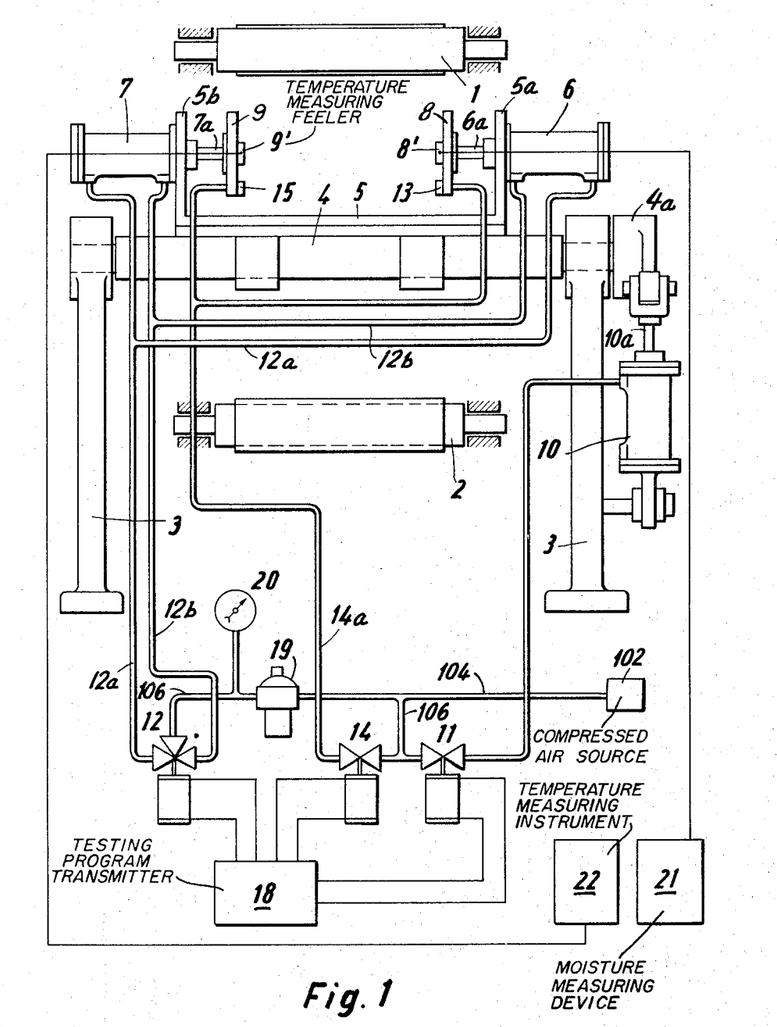
FIG. 1 is a somewhat schematic partial front elevational view of a device for testing tobacco constructed in accordance with the invention.
Figure 2:
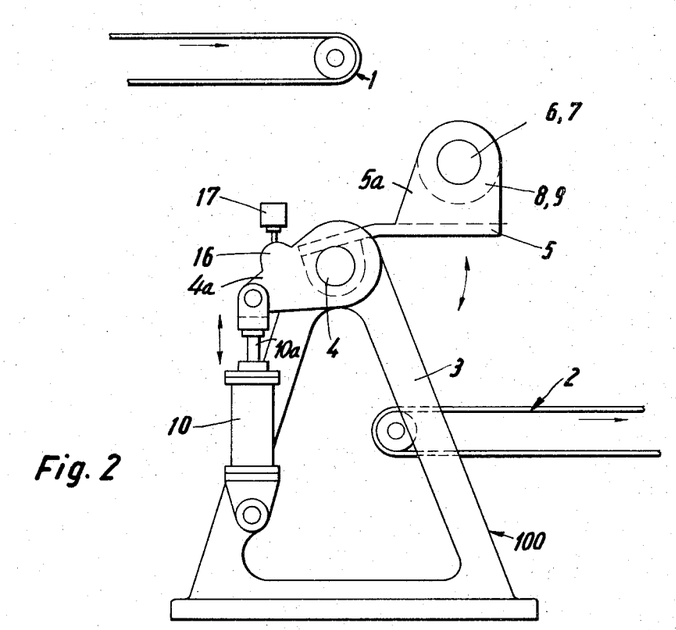
FIG. 2 is a side elevational view of the device indicated in FIG. 1.
Figure 3:
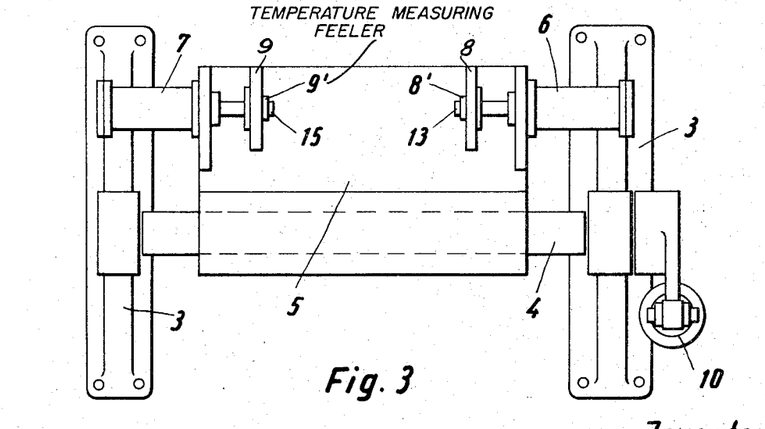
FIG. 3 is a top plan view of the device indicated in FIG. 1.

Referring to the drawings, and in particular to the embodiment of the invention indicated in FIGS. 1–3, there is shown a testing device generally designated 100 for automatically and periodically testing tobacco which is conveyed or delivered in a continuous moving stream. Tobacco is conducted on a conveyor generally designated 1 in the direction of the arrow indicated in FIG. 2 and drops over the measuring device 100 onto a second conveyor generally designated 2 on which it is carried away in the direction of the arrow indicated in FIG. 2.

In accordance with the invention, the measuring device 100 comprises a base 3 on which is rotatably mounted a shaft 4. Material supporting means including a collecting plate, platform or sampling trough 5 is secured to the shaft 4 for rotation therewith and includes upstanding side portions 5a and 5b which carry compressed air cylinders 6 and 7, respectively, having axes which are aligned. Pistons (not shown) are slidable in the cylinders 6 and 7 and each has a connecting rod 6a and 7a, respectively, which carries a compacting or measuring plate 8 and 9, respectively. The pistons within the respective cylinders 6 and 7 together with the associated compacting plates 8 and 9 are adapted to be moved together or apart by admitting a control fluid such as compressed air into the cylinders on a selected side of the piston (not shown) through the control fluid lines 12a and 12b. Each compacting plate 8 carries measuring electrodes or feelers 8' and 9', respectively. The electrode 9' is a temperature feeler for indicating temperature on a thermometer 22 and the electrode 8' is a feeler for indicating moisture conditions of the product being tested on a hygrometer 21.

Pivotally mounted adjacent the bottom of a side leg portion of the frame 3 is a compressed air cylinder 10 having a piston (not shown) slidable therein with a piston rod 10a which is pivotally connected to a crank arm 4a which is affixed to the shaft 4 for rotation therewith. The piston rod may be moved upwardly and downwardly in the directions of the double arrows for the purpose of rocking the crank lever 4a and turning the shaft together with the plate 5 for positioning the plate 5 for receiving the tobacco directed between the conveyors 1 and 2, or for tilting the plate for depositing the tested sample of the tobacco onto the conveyor 2. All of the compressed air cylinders 6, 7 and 10 are fed from a common compressed air source with the control being effected by a magnetic or solenoid valve 11 for the cylinder 10 and a magnetic or solenoid valve 12 for the cylinders 6 and 7. The cylinders 6 and 7 are connected through the lines 12a and 12b for parallel operation and thus, can be moved simultaneously toward each other or away from each other.

The measuring plates or compacting plates 8 and 9 are equipped with slot-shaped compressed air nozzles 13, for the plate 8, and 15 for the plate 9. The slot is shaped to direct a stream of air across the associated plate to make certain that the plate and the electrodes are free of tobacco residues and to also make certain that the temperature of the feelers 8′ and 9′ are reduced below the normally expected sampling temperature during each testing cycle. The slots or nozzles 13 and 15 are controlled through a magnetic or solenoid valve 14, which is operated to deliver a blast of air through the control lines 14a after each testing cycle in which the plates 8 and 9 are moved outwardly away from each other.

The crank lever 4a carries a control surface or cam 16, which moves upwardly against a contact of a contact switch 17 to close the contact and to open the valve 14 to start the supply of compressed air to the nozzles 13 and 15 after the testing cycle is finished and the tobacco sample is being dumped.

Figure 7:
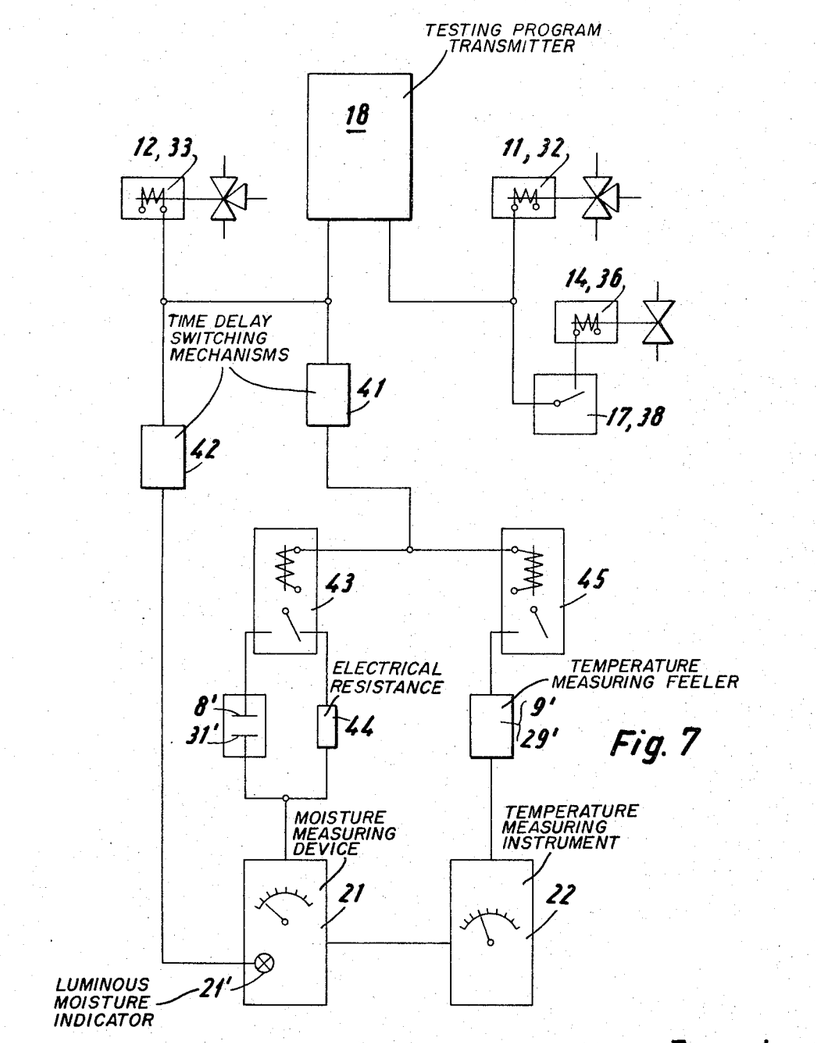
FIG. 7 is an electrical diagram of the connection of the programming device to the actuating valves and measuring instruments.

The magnetic valves 11, 12 and 14 are all actuated in a selected sequence by an electronic measuring programmer 18, which device is known per se. The programmer 18 makes the individual phases of each measuring cycle return periodically in each sample testing cycle corresponding to the program determined to be most favorable in the respective case. The programmer 18 acts on the magnetic windings of the solenoid valves 11, 12 and 14 and a schematic connection of the programmer is indicated in FIG. 7 to be described more fully hereinafter.

Air under pressure is delivered from a compressed air source 102 through a pressure line 104 for delivery through a line 106 to the valves 11 and 14. A pressure reducing valve 19 is located between the line 104 and a line 106 connected to the magnetic valve 12. A manometer 20 is located in the line 106 for determining the pressure in this line in accordance with the setting of the reducing valve 19. The reducing valve 19 is set such that the pressure exerted by the compacting plates 8 and 9 against the test sample will be a pressure which will be most suitable for testing purposes and which will be uniform in all similar testing.

In operation, the test material, in the present case the cut tobacco, is fed to the measuring device over the conveyor 1 in a continuous current and drops onto the collecting plate 5 when the latter is in the position indicated in FIG. 2. A tobacco sample accumulates on the plate 5 and between the measuring plates 8 and 9 and the excess tobacco falls off the plate 5 and onto the conveyor belt 2. The programmer 18 then causes actuation of the valve 12 to move the plates 8 and 9 together to compact the sample to a compacting pressure suitable for the testing period as set by the reducing valve 19. The programmer also causes the actuation of the instruments 21 and 22 which are connected to the feelers 9′ and 8′, respectively, to obtain an indication of temperature and moisture. In some instances the moisture indication is modified automatically by a suitable connection from the temperature indicator 22 to effect a compensation for the temperature sensed. The compacting pressure is maintained for the desired testing period, and after the measurement is completed, the magnetic valve 12 is again actuated to cause the retracting of the plates 8 and 9. In addition, the magnetic valve 14 is actuated to cause a blast of air directly from the nozzles 13 and 15 and to clear the plates and to reduce the temperature of the feelers 8′ and 9′. The magnetic valve 11 is operated to cause the movement of the piston rod 10a and the downward pivoting movement of the plate 5 and the dumping of the test sample onto the conveyor 2. The cycle may advantageously be timed such that the compressed air will exit from the nozzles 13 and 15 during the removal of the tobacco and continue until the plate 5 is returned to the position indicated in FIG. 2 by a further actuation of the valve 11.

The testing device 100 thus acts to periodically and continuously operate to remove a sample of the material from the continuously flowing stream of current of the material. After the measurement the sample is returned to the current, or conveying stream, and a new sample is taken. The constantly recurring sampling and measuring process is controlled by the programmer and the whole process is completely automatic and continuous.

The moisture of the sample is determined through the electrode 8′ by a resistance measuring instrument 21. The temperature feeler 9′ is connected to indicate on the thermometer 22. It is important, in particular, that the feeler 9′ be cool before each testing cycle to a temperature slightly below the tobacco temperature.

Figure 4:
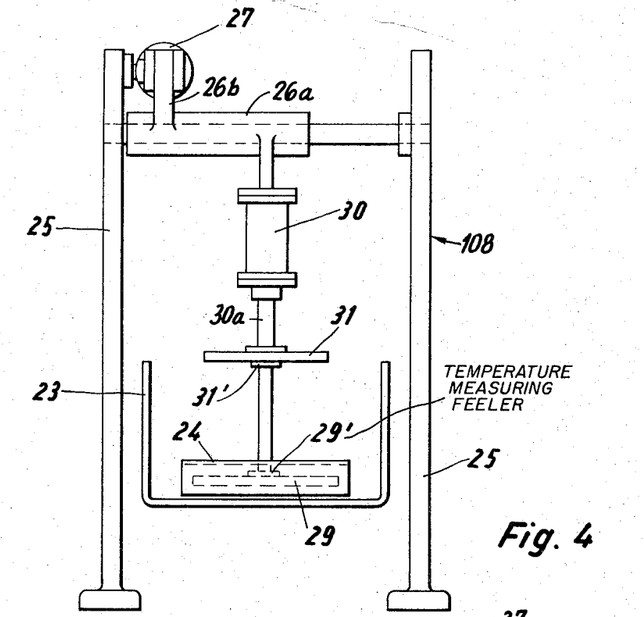
FIG. 4 is a front elevational view of another embodiment of a tobacco testing device.
Figure 5:
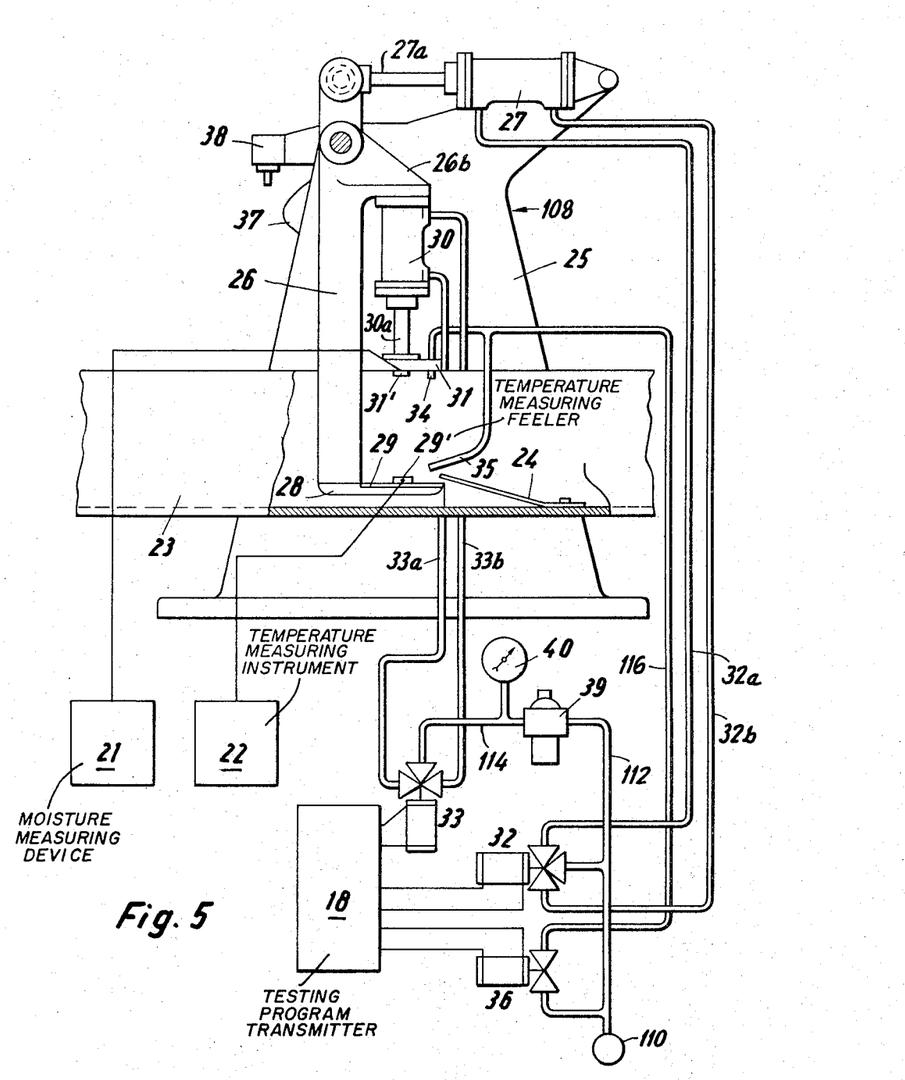
FIG. 5 is a side elevational view of the device indicated in FIG. 4.
Figure 6:
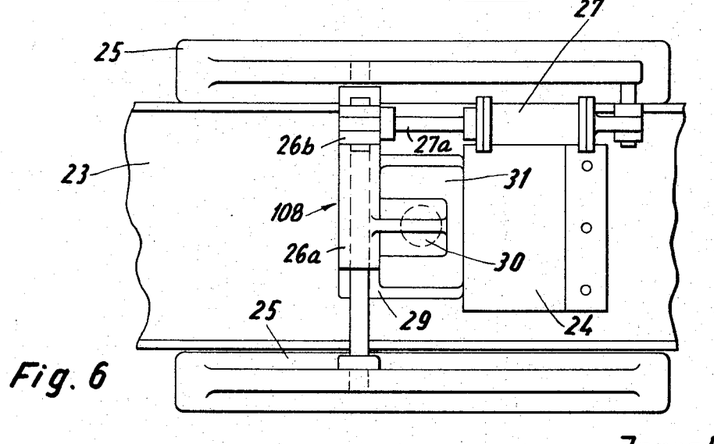
FIG. 6 is a top plan view of the device indicated in FIG. 4.

The compressed air exiting from the nozzles 13 and 15 is cut off by the action of the cam 16 on the switch 17 before the collecting plate 5 is returned to its starting position indicated in FIG. 2. Thereafter, the plate is in position for receiving a new sample from the tobacco current. As soon as the collecting plate 5 has reached its starting position, the individual measuring cycle is completed. The total direction of such a cycle can vary, for example, between 7 and 15 seconds. The individual phases of the measuring cycle, like the filling time, the contact pressure time and the time for the start and duration of the blowing device, are individually adjustable on the programmer 18 and can therefore be varied from one situation to another depending on the respective conditions if this should prove necessary due to the properties to the respective material supply. Another embodiment of the invention is indicated in FIGS. 4, 5 and 6, which comprises a testing device 108 which is applicable, particularly where the material to be tested, such as tobacco, is continuously moved within a trough 23 such as by the vibration of the trough. In this embodiment, means such as a deflecting plate or wedge 24 is provided for causing the tobacco which is advanced along the trough to move upwardly along the plate so that a sample may be deflected onto the testing device 108. The testing device 108 includes a stationary mount or frame 25 on which is journaled for rotation a sleeve 26a having an elongated lever arm portion 26 carrying a sampling or testing plate 29 at its outer end and includes a short shifting arm portion 26b which may be rocked by a piston rod 27a for shifting the orientation of the arm 26 in respect to the trough 23. For this purpose, a piston (not shown) is selectively moved within a pressure cylinder 27 by selectively admitting pressure through pressure lines 32a or 32b under the control of a solenoid valve 32. In the position indicated in FIG. 5, the arm 26 is in an operating position ready to receive a sample which may be deflected on to the plate 29 from the deflecting plate 24. The arm 26 may be shifted to an oblique position after testing to incline plate 29 for the purpose of dumping the sample off the plate 29 back into the trough 23.

The collecting plate 29, which is mounted on a shoe extension 28 of the arm 26, carries a temperature feeler or sensing element 29′. The upper portion of the arm 26 adjacent the pivot is provided with an extension 26b for mounting a pressure cylinder 30 having a piston (not shown) slidable therein for moving a connecting rod 30a secured to a measuring or compacting plate 31 for shifting this plate 31 toward and away from the plate 29. The plate 31 carries an electrode or sensing element 31' for sensing the moisture of the collected sample. The piston (not shown) which is slidable in the cylinder 30 is actuated through pressure control lines 33a and 33b regulated by a magnetic valve 33. The valve 33 is connected to a compressed air source 110 via a pressure line 112 and a constant regulated pressure line 114. The pressure in the line 114 is regulated by a reducing valve 39 and the pressure may be indicated on a pressure instrument or manometer 40. Magnetic valves 32 and 36 are connected to the pressure source 110 for regulating the piston and the cylinder 27 and for regulating the supply of an air blast through line 116 and out nozzles 34 for the plate 31 and 35 for the plate 29. The nozzle 35 provides not only cleaning of the plate 29, but also the cooling of the temperature feeler 29'. Both the nozzles are operated by the magnetic valve 36. The magnetic valve 36 is operated by a switch 38 which is actuated by a cam disc or protuberance 37 on the arm 26.

The measuring unit 108 operates in a manner similar to the other embodiment, and when the plate 29 is in the position indicated in FIG. 5, the material flowing in the trough 23 is continuously directed over the plate by the deflecting wedge 24. The programmer 18 causes movement of the plate 31 toward the plate 29 by actuation of the respective magnetic valves. The programmer then causes actuation of the instrument so that readings are taken by the devices 21 and 22, as in the other embodiment. The temperature measuring instrument 22 is advantageously connected electrically with the instrument 21 for effecting a compensation of the reading of the instrument 21 in accordance with the temperature which is sensed. After the testing is completed the sample is dropped into the stream in the trough 23 by moving of the arm 26 to an oblique position and by the moving of the plate 31 backwardly to the position indicated in FIG. 5. The electrode 31' and the temperature feeler 29' are cleaned and cooled, respectively, by the short compressed air blast through the nozzles 34 and 35.

During the measuring operation, the entire tobacco current continues to flow unhindered in the shaking trough 23 partly next to the wedge 24 and partly over the wedge. It can be seen in FIG. 4 that the wedge 24 is not as wide as the trough 23. When the plate 29 is in the position indicated in the drawings, the tobacco continues to accumulate thereon and any excess will flow over the accumulated tobacco and around the same. After a filling period of about two seconds, the measuring plate 31 is pressed with the electrode 31' by the compressed air cylinder 30 against the collecting plate 29 so that the tobacco is compressed between the plates to a predetermined pressure which can be checked by the manometer 40. Subsequently, the piston in the cylinder 27 is set in motion and to pivot arm 26 with the tobacco sample to be measured out of the tobacco current. After a predetermined contact pressure time which may last about two seconds, the electrode 31' is connected by a time relay (not represented) to the hygrometer 21.

After the measuring time for the moisture instrument, the compressed air cylinder 30 is actuated again and the measuring plate 31 moved back again. Since the tobacco sample is no longer entrained, it drops back into the tobacco conveyor stream. Thereafter, the arm 26 descends again to take a new tobacco sample from the current flow in the trough 23. During the lowering of the arm 26, the magnetic valve 36 is actuated by the electronic measuring programmer 18 to cause a blowing of compressed air from the slot-shaped nozzles 34 and 36 to clean and cool the measuring plate. The compressed air is shut off when the cam 37 moves out of contact with the switch 38. The total measuring period on the total measuring cycle lasts about seven to fifteen seconds, respectively.

The various phases, such as the filling time, the time for compressing the tobacco, the time for start and the duration of the blowing cycle, are adjustable individually on the programmer 18 depending upon experience. If considerable temperature differences are possible within a tobacco sample, it is advisable to arrange the moisture electrode and the temperature feeler alongside each other on the same plate on the same side of the sample. This applies, naturally, to both embodiments of the hygrometer according to the invention described above.

In FIG. 7, it can be seen that the programmer 18 influences directly the magnetic valves 12 and 33, and also actuates the time delay mechanisms 41 and 42. The time delay mechanisms may be of any design, for example, a switching mechanism operating on a pneumatic basis can be employed. Connected to the time delay mechanism 41 is a relay 43 whose operating contacts on the one hand excite the electrodes 8' and 31', respectively, during the measuring period, and on the other hand, connect an electrical equivalent resistor 44 during the phase of the measuring cycle in which there is no resistance measurement. The equivalent resistor 44 effects an indication of the basic value of the hygrometer. The size of the resistor 44 is so selected that the indication of the basic value coincides with the indicted value of the tobacco to be measured at the desired moisture condition. In this way, the indicator lag of the resistance measuring instruments, which can be connected with a recording mechanism, is eliminated. The pointer is not returned each time to a zero value, but is set after each measurement to the predetermined basic values so that only the differences in the readings between the measured value and the basic value are read as pointed deflections and these may be recorded.

The time delay mechanism 42 actuates over its operating contract a luminous moisture indicator 21', which is built into the hygrometer 21. For measuring the temperature, a relay 45 is connected to the time delay mechanism 41, whose operating contacts connect the temperature feeler 9' and 29', respectively, with the thermometer or indicator 22. The system is arranged in as far as posible to provide an inertialess and thus clear reading of the measured values despite the periodically recurring measurements, particularly in respect to the recording measuring mechanisms. In the operating cycle of the measuring period, the electric resistor 44 is connected during the filling time of the collecting plate with the hygrometer 21 over the relay 43 so that the hygrometer constantly indicates a basic value which is determined by the size of the resistor 44. This basic value is the same in the corresponding measuring phase during each measuring period.

The contact pressure phase follows the filling period and is switched in by the programmer 18. Only after one-third of the contact pressure time elapses is the relay 43 actuated by the delay mechanism 41, which is actuated by the programmer 18 so that the base resistor 44 is disconnected and the measuring electrodes 8' and 31', respectively, are connected to the hygrometer. At this stage, the moisture reading is obtained.

After another one or two seconds, the time delay mechanism 42 is connected by the programmer 18 and connects the luminous moisture indicator. The instrument 21 is ordinarily graduated to indicate, depending on the measured value, a variation of the measured value from the basic value as reading either "normal," "dry" or "moist." After the contact pressure time has elapsed, the measuring electrodes 8' and 31' are disconnected again and the base resistor 44 connected to the hygrometer.

While specific embodiments of the invention have been shown and described in detail to illustrate the application of the inventive principles, it will be understood that the invention may be embodied otherwise without departing from such principles.

What is claimed is:

1. A method of determining the moisture characteristics of fibrous, leafy and similar materials, particularly tobacco, using an electric measuring means for indicating moisture including electrodes, comprising moving the material in a continuously moving stream, regularly and periodically removing a sample of material from the continuously moving stream and compressing it to a predetermined constant compression pressure against the electrodes, and simultaneously actuating the electric measuring means for indicating the moisture while the material is being compressed.

2. A method of determining the moisture of fibrous, leafy and similar materials, particularly tobacco, using an electric measuring means for indicating moisture and an electrical measuring means for indicating temperature each including electrodes, comprising moving the material in a continuous conveyed stream, regularly and periodically removing a sample of material from the conveyed stream and compressing the sample of material to a predetermined constant pressure against the electrodes for the temperature and moisture indications, simultaneously actuating the electrical measuring means for indicating moisture and temperature while the material is being compressed, and also simultaneously correcting the reading of the moisture in accordance with the temperature sensed.

3. A method, according to claim 2, wherein the temperature of the sample is measured during the measuring cycle within the same period in which the moisture is measured.

4. A method of determining the moisture of fibrous, leafy and similar materials, particularly tobacco, where the material is being conveyed in a continuous stream and using an electric measuring means for indicating moisture as well as an electric measuring means for indicating temperature, each of said electrical measuring means including electrodes for sensing the values, comprising moving the material in a continuously moving stream, regularly and periodically removing a sample of the material for testing at regular intervals from the stream of the material, compressing the removed materials to a predetermined constant compression pressure against the electrodes or feelers, simultaneously actuating the electrical measuring means for indicating the moisture and the temperature while the material is being compressed, and thereafter releasing the sample and returning it to the stream.

5. A device for determining the moisture of fibrous, leafy and similar materials, particularly of tobacco, comprising displaceable means for supporting a sample of material to be tested, means on said supporting means for compressing the material on said supporting means to a predetermined pressure, electrical moisture indicating means including a sensing element located at said supporting means and engageable with the material thereon when the latter is compressed by said compressing means, and means for actuating said compressing means and said electrical moisture indicating means to indicate the moisture of the material samples when the samples are compressed by said compressing means, means for conveying the material in a continuously moving stream, said means for supporting a sample of material to be tested being located in said stream in a position to be continuously filled with material from said stream when said displaced supporting means is in a filling position, and means for moving said supporting means to a dumping position oriented to return the material to the stream after the material is compressed and tested.

6. A device for determining the moisture of fibrous, leafy and similar materials, particularly tobacco, comprising means for supporting a sample of material to be tested, means on said supporting means for compressing the material on said supporting means to a predetermined pressure, electrical moisture indicating means including a sensing element located at said supporting means and engageable with the material thereon when the latter is compressed by said compressing means, means for actuating said compressing means and said electrical moisture indicating means to indicate the moisture of the material samples when the samples are compressed by said compressing means, means for conveying the material in a continuous stream, said means for supporting a sample of material to be tested being located in said stream and adapted to be continuously filled with material from said stream, means for moving said supporting means to return the material to the stream after the material is compressed and tested, said means for conveying the material in a continuous stream including a first conveyor and a second conveyor located in alignment with the end of said first conveyor and below said first conveyor, said supporting means being located between said first and second conveyors in a position to receive material dropped from said first conveyor toward said second conveyor, and means connected to said supporting means for shifting said supporting means to dump material therefrom onto said second conveyor after it has been tested.

7. A device for determining the moisture of fibrous, leafy and similar materials, particularly tobacco, comprising means for supporting a sample of material to be tested, means on said supporting means for compressing the material on said supporting means to a predetermined pressure, electrical moisture indicating means including a sensing element located at said supporting means and engageable with the material thereon when the latter is compressed by said compressing means, means for actuating said compressing means and said electrical moisture indicating means to indicate the moisture of the material samples when the samples are compressed by said compressing means, means for conveying the material in a continuous stream, said means for supporting a sample of material to be tested being located in said stream and adapted to be continuously filled with material from said stream, means for moving said supporting means to return the material to the stream after the material is compressed and tested, said means for continuously conveying material including a continuous trough for the material being conveyed, said supporting means including a pivotal lever member having a supporting platform at its lower end, means pivotally supporting said lever member to permit the lower end with the platform to be arranged substantially horizontal within said trough, means connected to said lever to shift said lever to tilt the platform in said trough for dropping the material back into said trough after testing, and means in said trough for deflecting material onto said platform during the movement of the stream.

8. A device for determining the moisture of a material such as tobacco, comprising a supporting platform for material to be tested, at least one plate adjacent to and in alignment with said supporting platform, means for moving said plate and said platform relatively to compress material on said platform and to urge said plate and platform together to exert a uniform compression pressure on said material, sensing means on at least one of said platform and said plate, electrical means connected to said sensing means and to said moving means for indicating moisture of the material when said moving means is acting to compress said material, said sensing means including a first element for sensing temperature and a second element for sensing moisture, said electrical means further including means connected to said temperature sensing element for indicating temperature, and fluid pressure means adjacent said platform and said plate for directing a fluid against said platform and said plate for cooling and cleaning purposes after the material is tested and removed from said platform.

9. A device for determining the moisture of fibrous, leafy and similar materials, particularly of tobacco, comprising means for supporting a sample of material to be tested, means on said supporting means for compressing the material to a predetermined pressure, electrical moisture indicating means including a sensing element located adjacent said supporting means and engageable with the material thereon when the latter is compressed by said compressing means, means for moving the material continuously, programming means for moving said supporting means into a position along the path of the moving material for receiving a sample of the material, for thereafter actuating said compressing means, and thereafter actuating said electrical moisture indicating means to obtain an indication of the moisture of the material and to return the material to the stream and to release said compressing means after such indication has been obtained.

10. A device for testing material such as tobacco adapted to be positioned between upper and lower conveyors in a position to receive material from the upper conveyor which is directed toward the lower conveyor comprising a supporting frame, a platform pivotally supported on said frame and projecting outwardly therefrom to a position between the upper and lower conveyors, fluid pressure means on said frame for pivoting said support platform between a position in which it extends substantially horizontally between the upper and lower conveyors to an inclined position for dumping materials therefrom onto a conveyor, first and second plates on said platform mounted for movement toward and away from each other, fluid pressure means on said platform for moving said plates toward each other and for urging them together to compress material therebetween at a uniform pressure and for thereafter moving them apart for releasing the material, a sensing element carried by said plate for sensing moisture conditions, electrical measuring means connected to said sensing element for indicating moisture conditions and electrical programming means connected to said fluid pressure means for pivoting said supporting platform to said fluid pressure means for moving said plates and to said electrical measuring means for moving the plates together to compress material therebetween, to actuate said measuring means after the material is compressed for indicating the moisture conditions of the material, to release the plates and permit the outward movement thereof, and to pivot said platform downwardly to drop the material after it is tested.

11. A device for testing material such as tobacco adapted to be positioned between upper and lower conveyors in a position to receive material from the upper conveyor which is directed toward the lower conveyor comprising a supporting frame, a platform pivotally supported on said frame and projecting outwardly therefrom to a position between the upper and lower conveyors, fluid pressure means on said frame for pivoting said supporting platform between a position in which it extends substantially horizontally between the upper and lower conveyors to an inclined position for dumping materials therefrom onto a conveyor, first and second plates on said platform mounted for movement toward and away from each other, fluid pressure means on said platform for moving said plates toward each other and for urging them together to compress material therebetween at a uniform pressure and for thereafter moving them apart for releasing the material, a sensing element carried by said plate for sensing moisture conditions, electrical measuring means connected to said sensing element for indicating moisture conditions and electrical programming means connected to said fluid pressure means for pivoting said supporting platform and to said fluid pressure means for moving said plates and to said electrical measuring means for moving the plates together to compress material therebetween, to thereafter actuate said measuring means for indicating the moisture conditions of the material, for releasing the plates and permitting the outward movement thereof, and for pivoting said platform downwardly to drop the material after it is tested, means adjacent said plate for clearing the material off said plate and for cooling said electrode being connected to said programming means for causing a blast of fluid adjacent said plate and said electrode after testing.

12. A device for testing a material such as tobacco for moisture conditions which is conveyed in a continuous stream from an upper conveyor to a lower conveyor comprising a supporting frame, a lever arm member pivotally supported on said frame and having a platform thereon which extends substantially horizontal in a position below the end of the upper conveyor when said lever arm member is substantially vertical, a plate carried by said arm, means for moving said arm toward and away from said platform, means for pivoting said lever arm to shift the platform from a horizontal position to an inclined position for dumping the material thereoff onto the second conveyor, first and second plates on said platform mounted for movement toward and away from each other, means for moving said first and second plates together to compress the material on said platform therebetween, a sensing element carried by said plates for sensing moisture conditions, electrical measuring means connected to said sensing element for indicating moisture conditions, and programming means connected to said means for shifting said lever arm and to said electrical measuring means and to said means for moving said plates together for compressing the material therebetween, for actuating said electrical measuring means for indicating moisture of the material, for releasing the compressed material by separating said plates, and for pivoting said lever arm for dumping the material off the inclined platform, first and second sensing elements located between said plate and said platform for sensing temperature and moisture of the material respectively, and electrical measuring means connected to said first and second sensing elements for indicating moisture and temperature.

13. A device according to claim 12, including means for directing air adjacent said temperature sensing element for cleaning away material and for cooling the element after each testing cycle.

References Cited

UNITED STATES PATENTS

| | | | |
|---|---|---|---|
| 2,277,953 | 3/1942 | Christensen | 324—61 |
| 2,350,378 | 6/1944 | Wallace | 324—30 X |
| 2,764,892 | 10/1956 | Rosenthal | 324—62 |
| 3,046,623 | 7/1962 | Dietert et al. | 324—62 |
| 3,081,429 | 3/1963 | Moe | 324—61 |
| 3,188,563 | 6/1965 | Jameson | 324—65 X |
| 2,231,035 | 2/1941 | Stevens et al. | 324—61 |
| 2,653,298 | 9/1953 | McKinley | 324—65 |
| 2,768,629 | 10/1956 | Maul | 324—65 X |
| 3,059,178 | 10/1962 | Farenkopf | 324—65 |
| 3,114,613 | 12/1963 | Neitzel et al. | 324—65 X |

FOREIGN PATENTS

| | | |
|---|---|---|
| 508,512 | 9/1930 | Germany. |
| 724,042 | 8/1942 | Germany. |

RUDOLPH V. ROLINEC, *Primary Examiner.*

WALTER L. CARLSON, *Examiner.*

C. F. ROBERTS, *Assistant Examiner.*